Patented Apr. 9, 1929.

1,708,181

UNITED STATES PATENT OFFICE.

PAUL KLEIN AND ANDREW SZEGVÁRI, OF BUDAPEST, HUNGARY, ASSIGNORS TO THE ANODE RUBBER COMPANY LIMITED, OF LONDON, ENGLAND.

MANUFACTURE OF RUBBER GOODS.

No Drawing. Application filed June 5, 1925, Serial No. 35,199, and in Great Britain February 13, 1925.

This invention relates to the direct production of rubber goods from rubber dispersions.

Various methods have become known for the direct production of rubber goods from rubber dispersions, especially from latex, for example by simple or repeated dipping, by spreading or by electrophoretic methods. In order to produce commercial rubber goods, it is necessary to incorporate different conditioning substances, for example curing or softening agents, accelerators, filling or colouring substances in a certain and sometimes considerable percentage. Though some of these substances e. g. sulphur may be incorporated subsequently into the rubber goods—especially if these goods are thin—it is however preferable and sometimes necessary to add said substances to the latex or any other rubber dispersion (for which the term "latex" is hereinafter used) so that the conditioning matters will be precipitated, agglomerated or coagulated together with the rubber. The incorporation of said conditioning substances by merely adding them to latex is however often connected with practical difficulties either owing to the behaviour of said substances towards the dispersion liquid of the latex, the dispersed rubber or towards the cataphoretic action of the electric current if the rubber is to be deposited by this method. Thus for example the specific weight of said conditioning substances may differ to such an extent from that of the latex, or of the dispersing liquid (water), that it is difficult to prevent said substances from settling or agglomerating on the surface of the latex, i. e. it is difficult to maintain an even distribution of said conditioning substances throughout the whole mass of the latex. Another difficulty that may arise is that the substance added to the latex in a dispersed state may form with the latex aggregates or may flocculate. Although in some cases such flocculation may be prevented by the addition of protective colloids such as casein, gelatine, albumin and the like substances, it may sometimes not be desired to incorporate such colloids with the rubber, so that this method cannot be resorted to in every case for preventing flocculation of the conditioning substances.

Again it may cause great practical difficulties to obtain the substance to be added to the latex in a sufficiently fine state of dispersion which is for example the case when certain oils are used.

Or when employing electrophoresis, the relative velocity of the electrophoretic migration of the particles of the conditioning substance and of the rubber particles may be unsuitable for obtaining the desired percentage of the conditioning substances in an electrophoretic rubber deposit.

Finally any other specific property of the conditioning substance, for example its small affinity to water, may prevent or impede its intended incorporation with rubber.

According to the invention the above difficulties are avoided by combining the conditioning substance to be incorporated with the rubber with another substance in such a way, as to obtain a dispersion the particles of which consist of a combination of the different substances, which combination possesses in a less degree the undesirable properties of the particles consisting of a single conditioning substance.

In the following, several examples are given for obtaining different results.

First example.

It is often desirable to add liquid hydrocarbons or other oils to the rubber goods. Great difficulties are experienced in producing some of these oils in fine emulsions or in maintaining them in a finely emulsified state in the latex during the treatment of the latex for producing rubber goods or in preventing the accumulation of the oil on the surface of the latex. According to the invention this drawback may be eliminated by impregnating for example finely ground diatomaceous earth (kieselguhr) or the like with said oils. An aqueous dispersion of this impregnated kieselguhr added to the latex allows the even incorporation of oils with the goods produced from latex.

Second example.

Lead oxide must often be added to rubber goods and may be easily dispersed in latex but owing to its high specific weight, tends to settle quickly on the bottom. By preparing a thorough mixture of lead oxide and of kieselguhr, which has a much smaller specific weight, heating said mixture to above the melting point of the lead oxide and by subsequently disintegrating the mixture, a dispersion may be obtained, each particle of which consists of a combination of the heavy lead oxide and light kieselguhr. Such a compound dispersion will settle considerably slower than lead oxide alone and will be practically sufficient to obtain the desired percentage of lead oxide in the rubber goods.

Third example.

Sulphur is one of the most important substances, which have to be incorporated with rubber. Great difficulties are experienced in dispersing sulphur in a manner required for the production of homogenous rubber goods owing to the low affinity of sulphur to water, the low stability of an aqueous suspension and other properties of finely dispersed sulphur.

If however, finely powdered sulphur is thoroughly mixed with finely powdered kieselguhr, lamp black, kaolin or other suitable compounding substances, and the mixture—after being heated to above the melting point of sulphur—is finely ground, the particles of said mixture represent an adsorptive combination of sulphur and kieselguhr or sulphur and another compounding substance. This dispersion is stable and when mixed with latex will not flocculate the latex. With a suitable composition of the dispersion the homogenous incorporation of sulphur can be reached and the flocculation can be avoided. Even if the rubber goods are produced cataphoretically, the compound dispersions assist in producing the required technical effects.

Fourth example.

Another possibilty of incorporation of sulphur consists in heating sulphur in so high percentage with vulcanizable oils especially with unsaturated oils that the resulting substance will contain besides the sulphur combined with the oil a surplus of curing sulphur. The necessary percentage of sulphur will vary according to the quality of the oil. Rape-seed oil, for example, may combine with up to about 30% sulphur for its own vulcanization, so that a quantity of sulphur exceeding 30% up to a multiple of the weight of the oil will be added to the oil. The substance produced by heating of sulphur in oil will be dispersed and the particles of such dispersion will consist of a compound of sulphur and vulcanized oil. Such dispersion when added to the latex, can be suitably distributed and maintained in suitable distribution during the intended whole treatment of the latex. The particles of the dispersion consisting of sulphur and vulcanized oil, are easily wetted and have also excellent properties concerning the electrophoretic migration, so that sulphur dispersed in this way can be incorporated either by cataphoretic or by other means with the rubber deposit in very high percentages, even up to percentages sufficient to produce ebonite goods.

Fifth example.

Zinc oxide cannot be added in a finely dispersed state to latex without interfering with the stability of the other components of the rubber emulsion. If, however, an aqueous emulsion will be prepared in any well known manner, the particles of which consist of a combination of zinc oxide and rubber or the like, zinc oxide can be incorporated—for example by cataphoresis—with the rubber deposit in any percentage without interfering with the stability of the rubber emulsion.

In the above example two different conditioning substances have been combined, but of course three or more different substances can be combined to produce compound dispersions. Such, for example, sulphur, lamp black and kieselguhr can be mixed, the mixture heated to above the melting point of sulphur and ground to a dispersion. An easily dispersible substance can be obtained for example also by heating sulphur, kaolin or zinc oxide and rape-seed oil.

The above combinations are more or less purely adsorptive ones. In some cases, however, loose chemical compounds may be used for example zinc polysulphide for the introduction of sulphur.

The method according to this invention differs from the method hitherto known in that if two or more different additional substances had to be incorporated with rubber goods produced directly from latex by mixing said additional substances as suspensions with latex, these different substances have been dispersed separately and added as separate dispersions to the latex, whilst according to the method of the present invention, the different additional substances are combined, and the dispersion is prepared from the combined or compounded additional substances, so that the individual particles of the dispersion represent combinations of the several additional substances.

It is to be understood that our method can be used with latex or with any other natural or artificial emulsion of rubber or rubber-like substances either in the vulcanized or unvulcanized state, for the direct production of goods by dipping or any other method.

Having now particularly described and ascertained the nature of our said invention and in what manner same is to be performed, we declare that what we claim is:—

1. A process for the introduction of conditioning substances into rubber dispersions in which the conditioning substances are added to the rubber dispersion to be treated in the shape of a dispersion, the particles of which consist of a combination of two or more different substances.

2. A process according to claim 1, for the incorporation of liquid or fusible conditioning substances with the rubber deposit—in which said conditioning substances are caused to be imbued by another impregnable conditioning substance and the impregnated conditioning substance is dispersed in the rubber dispersion.

3. A process for the introduction of sulphur into rubber deposits according to claim 1, in which sulphur is heated in such percentages with vulcanizable oils that the resulting substance contains besides the sulphur combined with the oil a surplus capable of vulcanization, a dispersion being prepared from this combination of sulphur and vulcanized oil and added to the rubber dispersion to be treated.

4. A process according to claim 1, in which rubber is used as one component of the compound dispersion.

5. A process according to claim 1, in which sulphur, oil and one or more conditioning agents are heated and a dispersion prepared from the resulting substance is added to the rubber dispersion.

6. As a new product for use in the direct manufacture of rubber goods from aqueous rubber dispersions, the combination with an aqueous rubber dispersion of a dispersion of a plurality of substances in the form of dispersed particles each containing two or more different substances.

7. As a new product for use in the direct manufacture of rubber goods from aqueous rubber dispersions, the combination with an aqueous rubber dispersion of a dispersion of sulfur and one or more other substances in the form of dispersed particles each comprising sulfur and one or more other substances.

8. As a new product for use in the direct manufacture of rubber goods from aqueous rubber dispersions, the combination with an aqueous rubber dispersion of a dispersion of sulfur and vulcanized oil in the form of dispersed particles each comprising sulfur and vulcanized oil.

9. As a new product for use in the direct manufacture of rubber goods from aqueous rubber dispersions, the combination with an aqueous rubber dispersion of a dispersion of vulcanized oil and sulfur or sulfur containing material in the form of dispersed particles each comprising sulfur and vulcanized oil, the quantity of sulfur exceeding the quantity of oil.

10. As a new product for use in the direct manufacture of rubber goods from aqueous rubber dispersions, the combination with an aqueous rubber dispersion of a dispersion of mixed vulcanized oil and conditioning agents of a class comprising curing, coloring, accelerating, vulcanizing and filling substances, the dispersed particles of which latter dispersions each comprise vulcanized oil and one or more of said conditioning agents.

11. As a new product for use in the direct manufacture of rubber goods from aqueous rubber dispersions, the combination with an aqueous rubber dispersion of a dispersion of vulcanized oil and zinc oxide in the form of dispersed particles each comprising vulcanized oil and zinc oxide.

12. As a new product of manufacture, rubber goods produced directly from and by agglomeration of an aqueous rubber dispersion containing dispersed conditioning agents in the form of dispersed particles each comprising two or more of said conditioning agents.

13. As a new product of manufacture, rubber goods produced directly from and by agglomeration of an aqueous rubber dispersion containing dispersed sulfur and one or more other substances in the form of dispersed particles each comprising sulfur and one or more of said other substances.

14. As a new product of manufacture, rubber goods produced directly from and by agglomeration of an aqueous rubber dispersion containing dispersed sulfur and vulcanized oil in the form of dispersed particles each comprising sulfur and vulcanized oil.

In testimony whereof we affix our signatures.

Dr. PAUL KLEIN.
Dr. ANDREW SZEGVÁRI.